United States Patent Office 3,591,582
Patented July 6, 1971

3,591,582
PROCESS FOR PREPARING ALPHA-ACYLOXY KETONE STEROIDS
Francisco Alvarez, Palo Alto, Calif., assignor to Syntex Corporation
No Drawing. Original application Aug. 29, 1966, Ser. No. 575,556, now Patent No. 3,453,295, dated July 1, 1969. Divided and this application Feb. 12, 1969, Ser. No. 817,598
Int. Cl. C07c 169/28
U.S. Cl. 260—239.55
4 Claims

ABSTRACT OF THE DISCLOSURE

This discloses a process useful for preparing 3-keto-19-nor-$\Delta^{4,9(10)}$ steroids, which have known uses, by treating the corresponding 3-keto-10-carboxy-$\Delta^5$ steroids with about one molar equivalent of a positive halogen ion releasing agent in an organic tertiary amine solvent. Also disclosed is a process useful for preparing 2$\beta$,19-oxido steroids, which can be converted in accordance with known procedures to useful steroids, by similar treatment of the corresponding 3-keto-10-carboxy-5$\alpha$ or -5$\beta$ steroid or of a 3-keto-10-carboxy-$\Delta^{4,6}$ steroid. A similar process useful for preparing known and useful $\alpha$-acyloxy keto steroids from the corresponding keto steroids containing an $\alpha$-hydrogen atom is also disclosed.

---

This is a division of application Ser. No. 575,556, filed Aug. 29, 1966, now Patent No. 3,453,295.

This invention relates to the preparation of organic compounds. It specifically pertains to a process for the inter and intra attachment of a carboxylate group and to the preparation of useful steroids thereby.

Briefly, the above process involves the treatment of requisite starting compounds with a positive halogen ion releasing agent, such as molecular iodine, in the presence of an organic tertiary amine solvent, such as pyridine. The details hereof are described more completely hereinafter.

The aspect of this invention by which an intra attachment of a carboxylate group occurs involves the reaction, via the preferred conditions given in more detail hereinafter, of a 3-keto-10-carboxy-$\Delta^4$ steroid or a 3-keto-10-carboxy-$\Delta^{5(6)}$ steroid, to give the correspondingly 3-keto-19-nor-$\Delta^{4,9(10)}$ steroid in each instance.

United States Patent No. 3,258,471, discloses a method by which monoenes, namely 3-keto-10-carboxy-$\Delta^4$ steroids are treated with at least two molar equivalents of chlorine, bromine, iodine, or similar source of halogen to give a mixture of the corresponding trienes and tetraenes, that is, the corresponding $\Delta^{1,3,5(10)}$-trienes and $\Delta^{1,3,5(10),9(11)}$-tetraenes. Thus disclosed is a method of producing the ring A aromatic and 9(11)-dehydro ring A aromatic systems.

Now it has been discovered that by treating the same starting monoenes, a 3-keto-10-carboxy-$\Delta^4$-monoene steroid, or alternately, a 3-keto-10-carboxy-$\Delta^{5(6)}$-monoene steroid with substantially less than two molar equivalents of a positive halogen ion releasing agent such as those described in the above cited patent, that is, about one molar equivalent thereof, diene unsaturation is produced to the exclusion of the mixture of ring A aromatic and 1,3,5(10),9(11)-tetraene unsaturation. By practicing the process of this invention the corresponding 3-keto-19-nor-$\Delta^{4,9(10)}$-diene steroids are produced. Thus, by virtue of utilizing positive halogen ion releasing agent in about equal molar quantities with the amount of starting steroid in the presence of a tertiary amine solvent, a novel synthesis of the useful 3-keto-19-nor-$\Delta^{4,9(10)}$ system is obtained.

The novel process by which these useful 3-keto-19-nor-$\Delta^{4,9(10)}$ steroids are prepared is represented as follows:

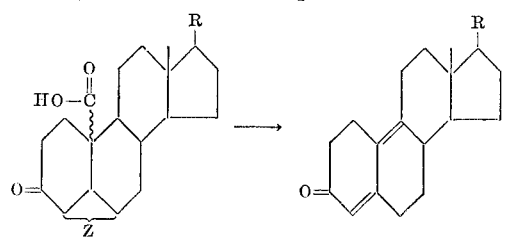

wherein
R is a keto group or the grouping

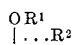

in which $R^1$ represents hydrogen, tetrahydrofuran-2-yl, tetrahydropyran-2-yl, cyclopentyl, or a hydrocarbon carboxylic acyl group containing less than 12 carbon atoms and $R^2$ represents hydrogen, lower alkyl, such as methyl, ethyl, propyl, butyl, hexyl, and the like, lower alkenyl, such as vinyl, allyl, and the like, or lower alkynyl (including halo-lower alkynyl), such as ethynyl, fluoroethynyl, chloroethynyl, bromoethynyl, propynyl, hexynyl, and the like or the grouping

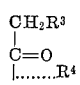

in which
each of $R^3$ and $R^4$ represent hydrogen, hydroxy, a hydrocarbon carboxylic acyloxy group containing less than 12 carbon atoms, or when taken together with the 20-keto group, a 17$\alpha$,20;20,21-bismethylenedioxy group; and
Z is a carbon-carbon double bond between C–4 and C–5 or between C–5 and C–6.

The symbol ($\int$) for the carboxyl group attached to the 10-position of the steroid nucleus in the starting material embraces both the $\alpha$ and $\beta$ configurations.

In addition to the foregoing 17-substituents, the 3-keto-10-carboxy-$\Delta^4$ and -$\Delta^{5(6)}$ steroids which can be employed as starting compounds in this process of the present invention can also contain other non-interfering substituents, for example, keto groups or derivatives thereof, such as enolized or ketalized keto groups; hydroxyl groups or derivatives thereof, such as esterified or etherified hydroxyl groups and, in the case of a pair of hydroxyl groups, for example, a 16$\alpha$-hydroxy group and a 17$\alpha$-hydroxy group, acetal or ketal derivatives; alkyl groups, for example, methyl groups; halogen atoms, for example, fluorine, chlorine, or bromine, and the like, at one or more of positions 1, 2, 4, 5, 6, 7, 8, 9, 11, 12, 14, 15, and 16, and can belong to the estrane, pregnane, spirostane, cholane, cholestane, stigmastane, and cardanolide series. These 10-carboxy starting compounds are prepared from the corresponding 19-hydroxy derivatives, such as by oxidation with a chromic acid solution.

Particularly valuable starting steroids for the instant process are as follows:

10$\beta$-carboxyestr-4-ene-3,17-dione,
10$\beta$-carboxyestr-5-ene-3,17-dione,
10$\alpha$-carboxyestr-4-en-17$\beta$-ol-3-one,
10$\beta$-carboxyestr-4-en-17$\beta$-ol-3-one,
10$\beta$-carboxy-17$\beta$-tetrahydropyran-2'-yloxyestr-4-en-3-one, 10β-carboxy-17β-acetoxyestr-4-en-3-one,
10α-carboxy-17α-methylestr-5-en-17β-ol-3-one,
10β-carboxy-17α-methylestr-4-en-17β-ol-3-one,
10-carboxy-17α-methyl-17β-tetrahydrofuran-2'-yloxyestr-4-en-3-one,
10β-carboxy-17α-ethylestr-4-en-17β-ol-3-one,
10β-carboxy-17α-butylestr-5-en-17β-ol-3-one,
10β-carboxy-17α-vinylestr-4-en-17β-ol-3-one,
10β-carboxy-17α-ethynylestr-4-en-17β-ol-3-one,
10β-carboxy-17α-ethynylestr-5-en-17β-ol-3-one,
10-carboxy-17α-ethynyl-17β-cyclopentyloxyestr-5-en-3-one,
10β-carboxy-17α-fluoroethynylestr-5-en-17β-ol-3-one,
10β-carboxy-17α-chloroethynylestr-4-en-17β-ol-3-one,
10β-carboxy-17α-bromoethynylestr-4-en-17β-ol-3-one,
10β-carboxy-17α-hexynylestr-5-en-17β-ol-3-one,
10α-carboxypregn-4-ene-3,20-dione,
10-carboxypregn-5-ene-3,20-dione,
10-carboxypregn-5-en-17-ol-3,20-dione,
10-carboxypregn-4-en-17α-ol-3,20-dione,
10-carboxy-17-acetoxypregn-4-ene-3,20-dione,
10α-carboxy-16-methylpregn-5-ene-3,20-dione,
10α-carboxy-16β-methylpregn-4-ene-3,20-dione,
10α-carboxy-16α-methylpregn-4-en-17α-ol-3,20-dione,
10α-carboxy-16α,17α-isopropylidenedioxypregn-5-one-3,20-dione,
10-carboxypregn-4-en-21-ol-3,20-dione,
10-carboxy-21-acetoxypregn-4-ene-3,20-dione,
10-carboxypregn-4-ene-17α,21-diol-3,20-dione,
10-carboxy-21-acetoxypregn-5-en-17α-ol-3,20-dione,
10α-carboxy-17,20; 20,21-bismethylenedioxypregn-4-en-3-one, and the like.

Another useful class of starting steroids are the 3-keto-7α-dihalomethyl-10-carboxy-Δ⁴ derivatives such as, for example, 7α-difluoromethyl-10-carboxyestr-4-ene-3,17-dione and various corresponding derivatives thereof. The 7α-dihalomethyl group is obtained by first forming a fused 6,7-dihalocyclopropyl group in a 3-keto-Δ⁴,⁶-diene by treatment thereof with an alkali or alkaline earth metal salt of haloacid such as, for example, trichloroacetic acid, chlorodifluoroacetic acid, and the like. The thus formed fused ring is then opened such as by treatment with zinc metal in acetic acid giving the 7α-dihalomethyl function.

A second aspect of this invention by which an intra attachment of a carboxylate group occurs involves the reaction, via the preferred conditions given hereinafter, of a 3-keto-10-carboxy-5α or -5β steroid, or of a 3-keto-10-carboxy-Δ⁴,⁶ steroid to give the corresponding 2β,19-oxido derivative. These lactones are formed by the intra attachment of the 10-carboxylate group at the C–2 position alpha to the keto function at C–3.

The transformation contemplated by this process is illustrated by the following partial formulas:

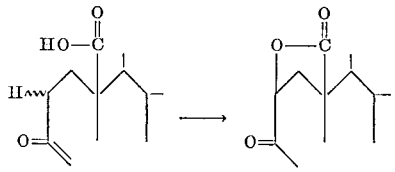

wherein the compounds are either ring A and B saturated or Δ⁴,⁶-dienes.

These thus prepared lactones are useful, for example, in the preparation of the corresponding 19-nor compounds thereof which are known to contribute significant anabolic, estrogenic, androgenic, and progestational activities, such as 19-nortestosterone, 19-norprogesterone, and the like. In addition, the product 2,19-oxido derivative of a 3β-hydroxy or 3-keto compound can be readily converted to the corresponding 2,3-dihydroxy compounds. Thus provided hereby is a method by which the useful 2,3-dihydroxy system can be introduced into the steroid nucleus, for example, in the preparation of such compounds as ecdysone. The prepared 2β,19-lactones can also be reduced, such as with lithium aluminum hydride at low temperatures, or otherwise transformed into pharmacologically active compounds via procedures known to the one skilled in the art.

The aspect of this invention by which an inter attachment of a carboxylate group occurs involves the reaction, via the preferred conditions given hereinafter, of a ketone having at least one acidic or available hydrogen atom attached to a carbon atom adjacent the keto function, and a hydrocarbon carboxylic acid of less than 12 carbon atoms, thus giving the corresponding α-acyloxy ketone derivative thereof.

The transformation thus contemplated can be illustrated as follows:

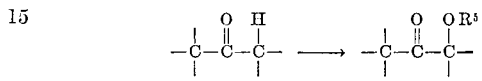

wherein R⁵ is a hydrocarbon carboxylic acyl group of less than 12 carbon atoms derived from the class of corresponding acids set forth and described in more detail hereinafter.

One example of the above inter attachment process is the preparation of an α-acyloxycyclohexanone, such as α-acetoxycyclohexanone, from cyclohexanone and acetic acid.

Another example thereof involves the preparation of α-acyloxy ketone steroids from the corresponding ketone steroids containing an α-hydrogen atom. Heretofore, α-acyloxy ketone steroids were obtained by first hydroxylating the desired carbon atom adjacent a keto function or by starting with a ketone steroid so hydroxylated followed by conventional esterification thereof. The instant process avoids this procedure by providing a direct one-step route to the α-esters.

Thus, in accordance with this aspect of the present invention, there is prepared a 21-acyloxypregnane from the corresponding 21-unsubstituted pregnanes. For example, 3β,17α,21-triacetoxy-5α-pregnan-20-one is prepared from 3β,17α-diacetoxy-5α-pregnan-20-one hereby. In a like manner, 2-acyloxy steroids are prepared from the corresponding 3-keto compounds containing an available hydrogen at position C–2 thereof. In addition, other α-acyloxy ketone steroids are prepared via the instant process from the corresponding ketone steroids containing an α-hydrogen atom including those steroids which, in addition to containing requisite associative functional system, possess the usual sites of unsaturation and usual functional groups and systems which are known to contribute significant physiological and hormonal properties. A partial list of those starting steroids which are particularly useful in this embodiment follows:

androst-4-en-17β-ol-3-one,
estr-4-en-17β-ol-3-one,
pregn-4-en-17α-ol-3,20-dione,
pregna-1,4,6-triene-3β,17α-diol-20-one,
9α-fluoropregn-4-ene-3,20-dione,
pregn-4-ene-11β,17α-diol-3,20-dione, and
6α,9α-difluoro-16α,17α-isopropylidenedioxypregna-1,4-diene-3,20-dione.

In the practice of this invention, a starting compound of the classes described above is reacted in organic reaction medium provided by organic tertiary amine solvents, such as t-aliphatic amines, for example, trimethyl amine, diethylmethyl amine, dimethyl-n-butyl amine, triethyl amine, diethylisopropyl amine, and the like; t-alicyclic amines, for example, N-methylpyrrole, N-ethylpyrrole, N-methylpyrrolidine, 1,2 - dimethylpiperidine, N - ethylpiperidine, and the like; and t-aromatic amines, for example, N,N-dimethylaniline, N,N-diethylaniline, N,N-dimethyl-o-toluidine, N,N-dimethyl-m-toluidine, N,N-dimethyl-p-toluidine, benzylmethylethyl amine, N,N-dimethyl-α-naphthyl amine, N,N-dimethyl-β-naphthyl amine, α-collidine, β-collidine, γ-collidine, 2,4-lutidine, 2,6-lutidine, 3,4-lutidine quinoline, isoquinoline, α-picoline, β-picoline, γ-picoline, and the like, preferably pyridine, in the presence of about equal molar quantities (based upon the amount of starting steroid) of a positive halogen ion releasing agent, such as molecular chlorine, bromine, and iodine, N,N-dibromodimethylhydantoin, diiododimethylhydantoin, and N-bromo and N-iodo derivatives of (lower)aliphatic carboxylic acid amides and imides, such as N-chloroacetamide, N-bromoacetamide, N-iodoacetamide, N - chlorosuccinimide, N - bromosuccinimide, N-iodosuccinimide, and the like or appropriate mixtures thereof. Iodine is preferred. Thereafter, the product steroid is recovered from the reaction via any of the conventional methods, such as extraction, evaporation, chromatography, and the like.

As mentioned hereinbefore, the positive halogen ion releasing agent is operative in carrying out the process of the instant invention when used in about equal molar quantities with the amount of starting compound employed. The amine will be employed in an amount sufficient to insure the complete dissolution of the steroid starting material, for example, an amount ranging from about 3 cc. to about 100 cc., and preferably from about 10 cc. to about 15 cc. per gram of steroid starting material. Inert organic co-solvents or diluents, for example benzene, toluene, chlorobenzene, carbon tetrachloride, and the like, can also be present in varying amounts, if desired.

Temperatures ranging from about 20° C. to about 180° C. or more are operative in the instant process. Temperatures lower than room temperature can be used but undue lengths of time for the reaction may be required and special equipment may be needed. Temperatures above 180° C. can also be used but are generally unnecessary to sustain the reaction. Optimum temperature conditions are dependent upon the particular reactants employed therewith but range generally between about 50° C. and 150° C. Reaction times vary from about 4 hours to 24 hours at atmospheric pressure depending upon choice of reactants and temperatures.

The acyl and acyloxy groups referred to herein are preferably derived from hydrocarbon carboxylic acids containing less than 12 carbon atoms which may be saturated or unsaturated, of straight, branched, cyclic or cyclic-aliphatic chain structure aromatic and may be substituted by functional groups, such as hydroxy, alkoxy containing up to 5 carbon atoms, acyloxy containing up to 12 carbon atoms, nitro, amino or halogen. Typical ester groups thus included are acetate, propionate, butyric, caproic, enanthate benzoate, trimethylacetate, trichloroacetate, t-butylacetate, phenoxyacetate, cyclopentylpropionate, aminoacetate, β-chloropropionate, adamantoate, and the like.

The following examples serve to further illustrate the manner by which this invention can be practiced; however, they should not be construed as limitations upon the overall scope hereof.

PREPARATION

A mixture of 1 g. of 19-acetoxyandrost-4-ene-3,17-dione, 2 g. of choranil and 10 ml. of xylene is refluxed under an atmosphere of nitrogen for 16 hours. The mixture is cooled, washed with a cold 10% sodium hydroxide solution and then with water, dried over sodium sulfate and evaporated under reduced pressure. The residue is chromatographed on neutral alumina and further purified through recrystallization from acetone:hexane to yield 19-acetoxyandrosta-4,6-diene-3,17-dione.

To a stirred and refluxing solution of 1 g. of 19-acetoxy-androsta-4,6-diene-3,17-dione in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 6α,7α-difluoromethylene-19-acetoxyandrost-4-ene-3,17-dione.

Other dihalomethylene compounds are prepared by substituting the appropriate alkali or alkaline earth metal haloacetate for sodium chlorodifluoroacetate above.

To a stirred solution of 5 g. of 6α,7α-difluoromethylene-19-acetoxyandrost-4-ene-3,17-dione in 200 ml. of ethanol and 300 ml. of n-propanol is added a suspension of 400 g. of zinc-copper metal coupled in ethanol. The reaction mixture is stirred at room temperature for 4 days, filtered, the residue being washed with ethanol and diluted with water. This mixture is extracted with methylenechloride and the methylenechloride extracts are in turn washed with water, 2 N sodium bicarbonate solution, and finally, water. After drying the organic solution over magnesium sulfate, it is evaporated to dryness and chromatographed on alumina with hexane:methylenechloride, followed by methylenechloride:ethyl acetate to yield 7α-difluoromethylandrost-4-en-19-ol-3,17-dione.

To a stirred solution of 1 g. of 7α-difluoromethylandrost-4-en-19-ol-3,17-dione in 10 ml. of acetone, cooled to 0° C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 12 hours at 0–5° C. and diluted with water. The solid which forms is collected by filtration, washed with water and dried under vacuum to yield 7α-difluoromethyl-10-carboxyestr-4-en-3,17-dione which may be further purified by recrystallization from acetone:hexane.

In a like manner, other 3-keto-10-carboxy-7α-dihalomethyl-Δ$^4$ steroids are prepared in accordance with the procedures of this preparation.

Example 1

To a solution of 5 g. of 10-carboxyestr-4-ene-3,17-dione in 75 ml. of pyridine are added 4 g. of iodine crystals and this reaction mixture is then heated and maintained at 60° C. to 70° C. for 1 hour. Following the reaction period, the mixture is slowly poured into 1 liter of water, and the resulting mixture is then acidified by the careful addition of aqueous 30% hydrochloric acid thereto. Next, the acidified mixture is extracted with methylene chloride, and the resulting extracts are combined, washed twice with an aqueous 5% sodium thiosulfate solution and then with water, dried over anhydrous sodium sulfate and evaporated to dryness under reduced pressure, thus giving estra-4,9(10)-diene-3,17-dione.

Example 2

Ten grams of 10-carboxypregn-5-en-17α-ol-3,20-dione are dissolved in 100 ml. of pyridine containing 7 g. of iodine, and this reaction mixture is then heated and maintained at reflux for 2 hours. Following this reaction period, the mixture is treated as described in Example 1 above to give 19-norpregna-4,9(10)-dien-17α-ol-3,20-dione.

Example 3

The procedure of Example 1 is repeated in every detail, substituting the starting compounds listed under I below for the starting compound recited therein and affording in lieu of the final compound recited therein the requisite final compounds listed under II below.

I

7α-difluoromethyl-10-carboxyestr-4-ene-3,17-dione,
10-carboxyestr-4-en-17β-ol-one,
10-carboxy-17β-tetrahydropyran-2′-yloxyestr-4-ene-3-one,
10-carboxy-17α-methylestr-5-en-17β-ol-3-one,
10-carboxy-17α-ethynylestr-4-en-17β-ol-one,
10-carboxy-17α-chloroethynylestr-4-en-17β-ol-3-one,
10-carboxypregn-5-ene-3,20-dione,

I.—Continued 10-carboxy-17α-acetoxypregn-4-ene-3,20-dione,
10-carboxy-16α-methylpregn-5-ene-3,20-dione,
20-carboxy-16α-methylpregn-4-en-17α-ol-3,20-dione, and
10-carboxy-17α,20;20,21-bismethylenedioxypregn-4-ene-3-one.

II

7α-difluoromethylestr-4,9(10)-diene-3,17-dione,
estr-4,9(10)-dien-17β-ol-3-one,
17β-tetrahydropyran-2′-yloxyestra-4,9(10)-dien-3-one,
17α-methylestra-4,9(10)-dien-17β-ol-3-one,
17α-ethynylestra-4,9(10)-dien-17β-ol-3-one,
17α-chloroethynylestra-4,9(10)-dien-17β-ol-one,
19-norpregna-4,9(10)-diene-3,20-dione,
17α-acetoxy-19-norpregna-4,9(10)-diene-3,20-dione,
16α-methyl-19-norpregna-4,9(10)-dien-17α-ol-3,20-dione,
16α-methyl-19-norpregna-4,9(10)-dien-17α-ol-3,10-dione, and
17α,20;20,21-bismethylenedioxy-19-norpregna-4,9(10)-dien-3-one.

Example 4

The procedures of Examples 1, 2, and 3 are repeated utilizing the positive halogen ion releasing agent listed below in about equal molar quantities with the amount of starting compound, in lieu of iodine with similar results in each instance.

| | |
|---|---|
| bromine | N-bromoacetamide |
| N-chloroacetamide | N-iodosuccinimide |

Example 5

The procedures outlined in each of Example 1, 2, 3, and 4 are repeated utilizing the tertiary amine solvents listed below in lieu of pyridine with similar results in each instance.

| | |
|---|---|
| quinoline | 2,4-lutidine |
| β-collidine | N,N-dimethylaniline |

Example 6

To a solution of 5 g. of 10-carboxy-5β-androstane-3,17-dione in 50 ml. of pyridine is added portionwise 4 g. of iodine. The resultant mixture is heated at 100° C. for 2 hours after which time it is filtered. The cooled filtrate is washed with dilute hydrochloric acid and then with water to neutrality and extracted with methylene chloride. The extracts are then dried over sodium sulfate and concentrated by evaporated. The concentrate is chromatographed on silica gel giving 2β,19-oxido-5β-androstane-3,17-dione.

Similarly, 2β,19-oxido-5α-androstan-3β-ol-17-one is prepared from 10-carboxy-5α-androstan-3β-ol-17-one.

Example 7

By following the procedure set forth in Example 6 above, the following compounds are prepared from the requisite starting compounds.

2β,19-oxido-17α-methyl-5β-androstan-17β-ol-3-one,
2β,-19-oxido-17α-ethynyl-17β-acetoxy-5α-androstan-3-one,
2β,19-oxido-17α-vinyl-5α-androstane-3β,17β-diol,
2β,19-oxidoandrosta-4,6-diene-3,17-dione,
2β,19-oxido-6-chloropregna-4,6-diene-17a,21-diol-3,20-dione, and
2β,19-oxido-6,9α-difluoropregna-4,6-diene-3,20-dione.

The alternate positive halogen ion releasing agents listed in Example 4 and the alternate tertiary amine solvents listed in Example 5 are employed in lieu of iodine and pyridine in the preceding two examples (Examples 6 and 7) with similar results in each instance.

Example 8

To a mixture of 10 ml. of cyclohexanone and 5.7 ml. of acetic acid in 100 ml. of pyridine is added portionwise 25 g. of iodine crystals. The resultant mixture is heated at temperatures ranging from between 60° C. and 95° C. for 5 hours, after which time it is filtered. The resultant solution is washed with dilute hydrochloric acid and then with water to neutrality, and is then extracted with methylene chloride, the extracts being dried over sodium sulfate, and concentrated by evaporation. The concentrate is chromatographed on silica gel giving 2-acetoxycyclohexanone.

Example 9

To a solution of 5 g. of 3β,17αdiacetoxypregnan-20-one and 1 ml. of acetic acid in 50 ml. of pyridine is added 3 g. of iodine crystals and the mixture is heated at steam bath temperatures for 5 hours. Thereafter, the mixture is decanted and the supernatent liquid is washed with a dilute hydrochloric acid solution and then with water to neutrality and extracted with methylene chloride. The extracts are dried over sodium sulfate and concentrated by evaporation. The concentrate is chromatographed on silica gel, eluting with acetone-hexane to give 3β,17α,21-triacetoxypregnan-20-one.

Example 10

By following the procedure set forth in Example 9, the following compounds are prepared from the requisite starting compounds:

2β-acetoxyandrost-4-en-17β-ol-one,
2β-acetoxyestr-4-en-17β-ol-3-one,
2β,21-diacetoxypregn-4-en-17α-ol-3,20-dione,
21-acetoxypregna-1,4,6-triene-3β,17α-diol-20-one,
2β,21-diacetoxy-9α-fluoropregn-4-ene-3,20-dione,
2β,21-diacetoxypregn-4-ene-11β,17α-diol-3,20-dione, and
2β,21-diacetoxy-6α,9α-difluoro-16α,17α-isopropylidenedioxypregna-1,4-diene-3,20-dione.

Example 11

The procedure of Example 9 and the procedure outlined in Example 10 are repeated utilizing the hydrocarbon carboxylic acids listed below (in appropriate quantities) to give the corresponding α-acyloxy esters:

| | |
|---|---|
| formic | trichloroacetic |
| propionic | valeric |
| butyric | caproic |
| caprylic | enanthic |
| benzoic | |

What is claimed is:

1. A process for the preparation of α-acyloxy ketone steroids which comprises reacting a steroidal ketone having at least one hydrogen atom alpha to the keto group with a hydrocarbon carboxylic acid of less than 12 carbon atoms and about one molar equivalent of a positive halogen ion releasing agent in an organic tertiary amine solvent.

2. The process of claim 1 wherein the starting steroidal ketone is selected from the group consisting of androstanes and pregnanes.

3. The process of claim 2 wherein the positive halogen ion releasing agent is selected from the group consisting of iodine, bromine, chlorine, N-bromoacetamide and N-bromo-succinimide.

4. The process of claim 3 wherein the organic tertiary amine solvent is selected from the group consisting of pyridine, quinoline and β-collidine.

No references cited.

ELBERT L. ROBERTS, Primary Examiner

U.S. Cl. X.R.

260—397.4, 397.45, 397.47

UNITED STATES PATENT OFFICE
CERTIFICATE OF CORRECTION

Patent No. 3,591,582              Dated July 6, 1971

Inventor(s) Francisco Alvarez

It is certified that error appears in the above-identified patent and that said Letters Patent are hereby corrected as shown below:

Column 1, line 48, "correspondingly" should be -- corresponding --.

Column 3, line 19, "10-carboxypregn-5-en-17-ol-3,20-dione," should be -- 10-carboxypregn-5-en-17α-ol-3,20-dione, --.

Column 3, line 21, "10-carboxy-17-acetoxypregn-4-ene-3,20-dione," should be -- 10-carboxy-17α-acetoxypregn-4-ene-3,20-dione, --.

Column 3, line 25, "10α-carboxy-16α,17α-isopropylidenedioxy-pregn-5-one-3," should be -- 10α-carboxy-16α,17α-isopropylidene-dioxypregn-5-ene-3, --.

Column 3, lines 55 to 60, the first partial formula should appear as follows:

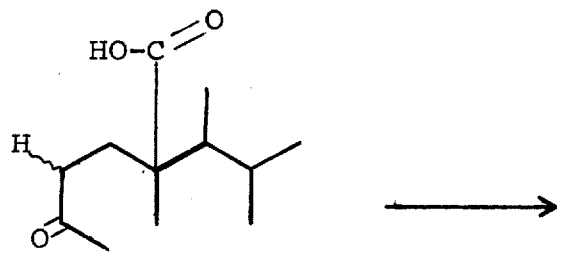

Column 6, line 11, "coupled" should be -- couple --.

Column 7, line 18, "16α-methyl-19-norpregna-4,9(10)-dien-17α-ol-3,10-dione," should be -- 16α-methyl-19-norpregna-4,9(10)-dien-17α-ol-3,20-dione, --.

Column 7, line 49, "evaporated." should be -- evaporation. --.

Signed and sealed this 27th day of June 1972.

(SEAL)
Attest:

EDWARD M. FLETCHER, JR.
Attesting Officer

ROBERT GOTTSCHALK
Commissioner of Patents